W. H. BACKUS.
Paper Toys.

No. 160,994. Patented March 23, 1875.

UNITED STATES PATENT OFFICE.

WILLIAM H. BACKUS, OF BOSTON, MASSACHUSETTS.

IMPROVEMENT IN PAPER TOYS.

Specification forming part of Letters Patent No. 160,994, dated March 23, 1875; application filed October 19, 1874.

*To all whom it may concern:*

Be it known that I, WILLIAM H. BACKUS, of Boston, in the county of Suffolk and State of Massachusetts, have invented a new and instructive Amusement, which I term "Paper-Flakes," of which the following is a specification:

My invention relates to an amusement which is designed more particularly for children, but is found to be equally interesting to those of mature age; and the invention consists in the preparation of a series of pieces of paper of various colors, on which are printed or stamped different designs, each piece of paper having a design in one corner, so that when the paper is folded in a certain manner indicated, the design is made to cover one side of the paper, which is left exposed, and, when thus folded, the portions of the design covered by the print or stamp are cut out by scissors. When the paper is unfolded, it is found to be cut into fanciful and oftentimes elaborate patterns of perfect symmetry and great beauty, and may be likened to the forms seen in the kaleidoscope, made permanent by being cut in paper, and composed of a number of symmetrical figures commingled and interlinked in quite a complicated manner.

Figure 2:
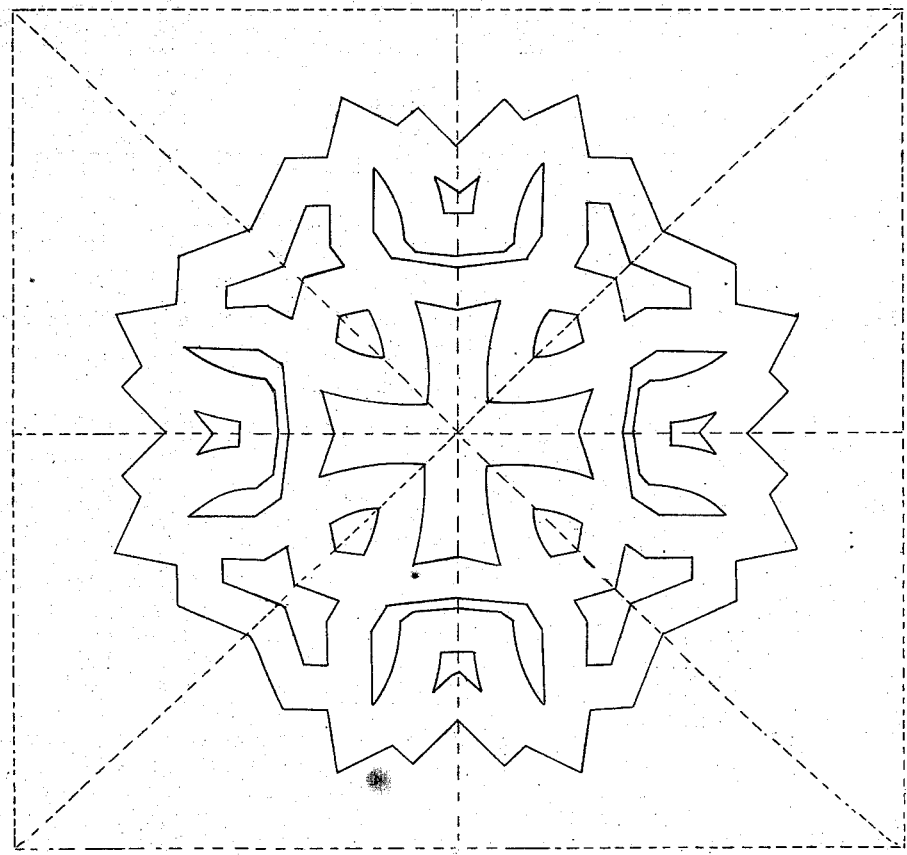
Figure 1:
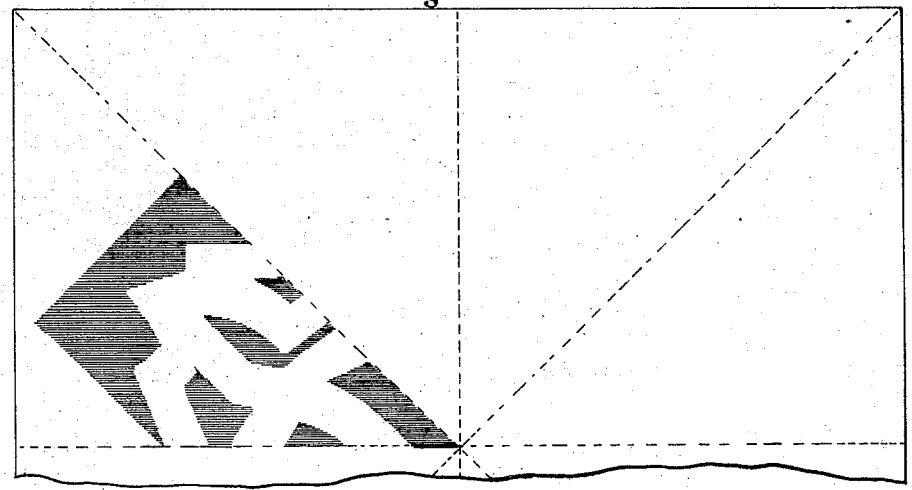

Referring to the drawings, Figure 1 shows a design which is printed or stamped on a small sheet of paper, one-half only of the sheet being shown in the figure. The dotted lines indicate the manner in which the paper is to be folded, the printed or stamped portion only remaining exposed when the paper is folded. The dark or stamped portions are then cut out with a pair of scissors, or otherwise, and, upon unfolding the sheet, the design shown in Fig. 2 will appear.

The figures, when cut out, can be put to quite a number of ornamental uses, as taste and ingenuity may suggest, and, if pasted in a book, upon leaves of tinted paper of a different color from that on which the designs are stamped, they make a curious and attractive volume.

This amusement is instructive to children, inasmuch as it educates the eye to symmetrical forms, and, while the curiosity is excited as to the result of the figure to appear, it tends to create a taste for beauty of form and design.

What I claim as my invention, and desire to secure by Letters Patent, is—

As a new article of manufacture, a toy consisting essentially of a sheet of paper printed or stamped with a sectional or incomplete figure arranged to form, when folded radially and cut out, as described, a symmetrical design in a single piece, substantially as shown, for the purpose set forth.

In testimony whereof I have signed my name to this specification in the presence of two subscribing witnesses.

W. H. BACKUS.

Witnesses:
  J. H. ADAMS,
  C. W. TUTTLE.